UNITED STATES PATENT OFFICE.

ARTHUR JAMES DAVIS, OF WEST BROMWICH, ENGLAND.

PROCESS OF PRODUCING ATTACHMENT-SURFACES UPON GLASS.

SPECIFICATION forming part of Letters Patent No. 652,091, dated June 19, 1900.

Application filed December 18, 1899. Serial No. 740,844. (Specimens.)

*To all whom it may concern:*

Be it known that I, ARTHUR JAMES DAVIS, a subject of the Queen of Great Britain, and a resident of Lynmouth, Birmingham road, West Bromwich, in the county of Stafford, England, have invented a certain new and useful Process of Producing Attachment-Surfaces upon Glass, of which the following is a specification.

This invention relates to improvements in the production upon cylindrical plates of glass of a peculiar roughened or "grip" surface, which is intended to serve as an adhesive means for attachment of such glass, when subsequently flattened, to walls or other similar purposes.

In carrying out this my invention I first prepare any suitable fusible chemical compound—such, as for instance, consisting of minium and silica—which is fused and mixed one part with about two parts of calcium phosphate. Such a mixture is further brought into almost a semifluid state by means of water or oil or varnish or the like. I now take the glass at that point in its manufacture when it has been blown, &c., into the cylindrical shape and ready for splitting and flattening. This cylinder is now split and ready for flattening, and while in this state I take the fusible compound, as before described, and by means of a brush or other suitable tool apply a coating of it to the glass upon its interior. I then take a comb, such as used, for instance, by grainers, or other similar tool having teeth, which may vary in coarseness according to desire, and with such a tool I operate upon the semifluid mixture in a simple but rapid manner, thereby producing a comb-like serrated roughened surface or grip in the mixture.

It is well known that in order to flatten the glass the split cylinder is submitted to heat and when so heated the flattening-tool is wrought upon the interior surface until the required flatness is attained. In this my invention this heating operation, however, not only prepares the glass for flattening, but also welds the mixture to the glass, and by the time the glass has been sufficiently heated for the flattening operation the mixture has become solidified and hardened, so as to readily permit of the flattening-tool being wrought thereon. Hence the one heating serves two operations, which hitherto have required separate heatings when the mixture has been applied after the glass has been flattened.

The further necessary treatment of the glass is carried out in the usual manner.

What I claim, and desire to secure by Letters Patent, is—

The process of producing rough attachment-surfaces upon glass which initially was a cylinder consisting of splitting said cylinder lengthwise and then treating the interior of the glass while in such form with an application of coating mixture and roughening the same, then submitting to heat and subsequently flattening the same, all as set forth and for the purposes specified.

ARTHUR JAMES DAVIS.

Witnesses:
C. HAYWARD POWELL,
ERNEST W. JONES.